(12) United States Patent
High et al.

(10) Patent No.: US 10,296,866 B2
(45) Date of Patent: *May 21, 2019

(54) SYSTEMS AND METHODS TO DISTRIBUTE AND AUTHENTICATE PRODUCT DELIVERY LOCKERS

(71) Applicant: Walmart Apollo, LLC, Bentonville, AR (US)

(72) Inventors: Donald R. High, Noel, MO (US); Bruce W. Wilkinson, Rogers, AR (US); Todd D. Mattingly, Bentonville, AR (US); Brian G. McHale, Chadderton Oldham (GB)

(73) Assignee: Walmart Apollo, LLC, Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/058,862

(22) Filed: Aug. 8, 2018

(65) Prior Publication Data
US 2018/0349843 A1 Dec. 6, 2018

Related U.S. Application Data

(63) Continuation of application No. 15/711,109, filed on Sep. 21, 2017, now Pat. No. 10,062,048.
(Continued)

(51) Int. Cl.
G06Q 10/08 (2012.01)
G05B 19/00 (2006.01)
(Continued)

(52) U.S. Cl.
CPC ......... G06Q 10/0832 (2013.01); B65D 88/12 (2013.01); B65D 88/74 (2013.01);
(Continued)

(58) Field of Classification Search
CPC ............ G06Q 10/0832; G07C 9/00571; G07C 9/00944; G07C 9/00896;
(Continued)

(56) References Cited

U.S. PATENT DOCUMENTS 5,475,378 A 12/1995 Kaarsoo
5,774,053 A 6/1998 Porter
(Continued)

FOREIGN PATENT DOCUMENTS

EP 2835078 2/2015

OTHER PUBLICATIONS

U.S. Appl. No. 15/711,109, filed Sep. 21, 2017, Donald R. High.
(Continued)

Primary Examiner — Adnan Aziz
(74) Attorney, Agent, or Firm — Fitch, Even, Tabin & Flannery LLP

(57) ABSTRACT

In some embodiments, systems, apparatuses and methods are provided to support the delivery of products. Some embodiments provide a retail delivery locker system comprising: multiple delivery lockers comprising: a housing enclosing an interior product cavity; a door enabling access to the product cavity; first and second docking couplers each configured to securely dock with a docking station and a docking coupler of another locker; and a communication link between the first and second docking couplers; and multiple docking stations each comprising: a locker coupler configured to secure a locker with the docking station; a station control circuit that obtains a first locker identifier from a first locker, confirms the first locker is scheduled to dock with a docking station, and authorize the locking of the docking station with the first docking coupler; and a transceiver enabling the station control circuit to communicate with a remote central control system.

20 Claims, 2 Drawing Sheets

Related U.S. Application Data

(60) Provisional application No. 62/401,757, filed on Sep. 29, 2016.

(51) Int. Cl.
    *B65D 88/74*     (2006.01)
    *B65D 90/00*     (2006.01)
    *G07C 9/00*     (2006.01)
    *B65D 90/48*     (2006.01)
    *B65D 88/12*     (2006.01)

(52) U.S. Cl.
    CPC ....... *B65D 90/0006* (2013.01); *B65D 90/008* (2013.01); *B65D 90/48* (2013.01); *G07C 9/00571* (2013.01); *G07C 9/00896* (2013.01); *G07C 9/00944* (2013.01); *G06Q 10/0836* (2013.01); *G07C 2009/0092* (2013.01); *G07C 2009/00634* (2013.01)

(58) Field of Classification Search
    CPC .. G07C 2009/0092; G07C 2009/00634; B65D 90/48; B65D 90/008; B65D 90/0006
    See application file for complete search history.

(56) References Cited

U.S. PATENT DOCUMENTS

| | | | |
|---|---|---|---|
| 6,323,782 B1 | 11/2001 | Stephens | |
| 6,806,807 B2 | 10/2004 | Cayne | |
| 6,882,269 B2 | 4/2005 | Moreno | |
| 8,749,382 B2 | 6/2014 | Sterzinger | |
| 9,256,852 B1 | 2/2016 | Myllymaki | |
| 9,387,928 B1 | 7/2016 | Gentry | |
| 9,764,836 B1 | 9/2017 | Elzinga | |
| 9,811,796 B2 | 11/2017 | Ogilvie | |
| 10,062,048 B2 | 8/2018 | High et al. | |
| 2002/0035515 A1* | 3/2002 | Moreno | A47G 29/141 340/5.73 |
| 2002/0116289 A1 | 8/2002 | Yang | |
| 2002/0167404 A1 | 11/2002 | Jordan | |
| 2005/0061877 A1 | 3/2005 | Stevens | |
| 2011/0130134 A1 | 6/2011 | Van Rysselberghe | |
| 2014/0180914 A1 | 6/2014 | Abhyanker | |
| 2014/0330603 A1* | 11/2014 | Corder | G06Q 10/0631 705/7.12 |
| 2015/0006005 A1 | 1/2015 | Yu | |
| 2015/0186840 A1 | 7/2015 | Torres | |
| 2015/0307276 A1* | 10/2015 | Hognaland | B65G 1/0464 700/218 |
| 2016/0027261 A1 | 1/2016 | Motoyama | |
| 2016/0176638 A1 | 6/2016 | Toebes | |
| 2016/0196755 A1* | 7/2016 | Navot | G05D 1/0676 701/4 |
| 2016/0207627 A1 | 7/2016 | Hoareau | |
| 2016/0216106 A1 | 7/2016 | Motoyama | |
| 2016/0300187 A1 | 10/2016 | Kashi | |
| 2016/0368464 A1* | 12/2016 | Hassounah | B60S 5/06 |
| 2017/0038780 A1 | 2/2017 | Fandetti | |
| 2017/0091710 A1 | 3/2017 | Van Dyke | |
| 2017/0091711 A1 | 3/2017 | Akselrod | |
| 2018/0089619 A1 | 3/2018 | High | |

OTHER PUBLICATIONS

Cisco; "Cisco Smart Locker", http://studylib.net/doc/14117023/cisco-smart-locker-the-next-generation-of-retail-delivery, 2015, pp. 1-3.

Kuckelhaus, Markus & Matthias Heutger; "Self-Driving Vehicles in Logistics;" DHL Trend Research; http://www.dhl.com/en/about_us/logistics_insights/dhl_trend_research/self_driving_vehicles.html#.WRXTS4jyuUk; 2014; pp. 1-39.

PCT; App No. PCT/US2017/053411; International Search Report and Written Opinion dated Nov. 29, 2017.

USPTO; U.S. Appl. No. 15/711,109; Notice of Allowance dated Apr. 9, 2018.

* cited by examiner

SYSTEMS AND METHODS TO DISTRIBUTE AND AUTHENTICATE PRODUCT DELIVERY LOCKERS

CROSS-REFERENCE TO RELATED APPLICATION

This application is a continuation of U.S. application Ser. No. 15/711,109, filed Sep. 21, 2017, which claims the benefit of U.S. Provisional Application No. 62/401,757, filed Sep. 29, 2016, which are incorporated herein by reference in their entirety.

TECHNICAL FIELD

This invention relates generally to product deliveries.

BACKGROUND

In a modern retail environment, there is a need to improve the customer service and/or convenience for the customer. One aspect of customer service is the ability of a customer to obtain products. There are numerous ways for customers to obtain products. However, there is a need to improve a customer's ability to obtain products.

BRIEF DESCRIPTION OF THE DRAWINGS

Disclosed herein are embodiments of systems, apparatuses and methods pertaining product deliveries. This description includes drawings, wherein.

Figure 1:
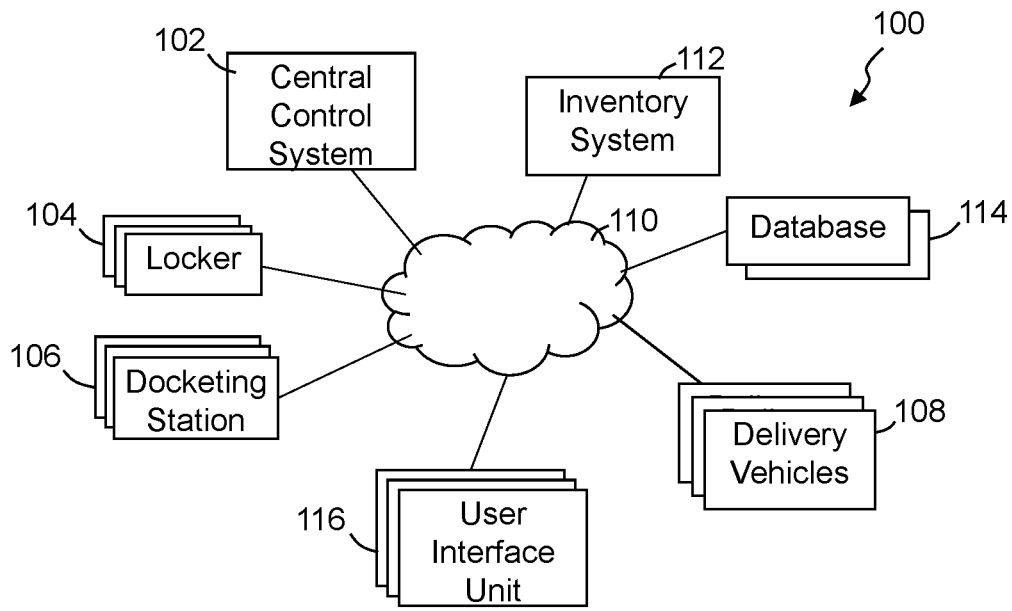
FIG. 1 illustrates a simplified block diagram of an exemplary product delivery system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to enhance product delivery in part through the authentication of product delivery lockers. In some embodiments, a retail delivery locker system comprises multiple delivery lockers. At least some of the delivery lockers can comprise a housing enclosing one or more interior product cavities into which one or more products are placed, and a door positioned within the housing and configured to open to enable access to at least the product cavity. The delivery lockers typically further include at least one and typically two or more docking couplers. At one of the docking couplers, and typically each of the docking couplers are configured to securely dock and lock with a docking station at a customer delivery location, and further configured to also securely dock and lock with a docking coupler of another of the multiple lockers. In some embodiments, the lockers include a communication link between a first docking coupler of a locker and a second docking coupler of the same locker. The lockers are configured to cooperate with one of multiple docking stations each positioned at different customer delivery locations. The multiple docking stations include at least one locker coupler configured to secure a locker with the docking station. In some embodiments, at least some of the docking stations include a station control circuit and memory accessible by the station control circuit and storing instructions that are executed by the station control circuit to cause the station control circuit to obtain a first locker identifier from a first locker of the multiple delivery lockers, confirm the first locker is scheduled to dock with a docking station of the multiple docking stations, and authorize the locking of the docking station with the first docking coupler. In some embodiments, the docking station further includes a transceiver enabling the station control circuit to communicate with a remote central control system.

FIG. 1 illustrates a simplified block diagram of an exemplary product delivery system 100, in accordance with some embodiments. The product delivery system 100 includes one or more central control systems 102, multiple product delivery lockers 104, and multiple docking stations 106. In some embodiments, the docking stations 106 and/or lockers 104 are configured to communicate over one or more, and in some application a collection of distributed computer and/or communication networks 110. Some embodiments include multiple delivery vehicles 108 that in part transport one more lockers to docking stations. The delivery vehicles can be in communication over the network 110 with at least the central control system 102.

Further, some embodiments include one or more inventory systems 112 and/or the central control system includes or is in communication with an inventory system. The inventory system can track product inventory of one or more product source locations from which products and/or lockers can be distributed for delivery to multiple different customers distributed about one or more geographic areas. In some embodiments, the inventory system further receives customer orders for products. The central control system and/or the inventory system can allocate products from one or more inventories of products to satisfy the orders, with at least some being scheduled for delivery to customers.

The central control system may further include and/or couple with one or more databases 114 that store relevant information, such as but not limited to inventory information, product information, customer information (e.g., customer profile information, customer delivery address(es), payment methods, etc.), locker information (e.g., locker identifier information, locker capabilities information, locker location information, locker scheduling information, operational status information, and the like), delivery vehicle information, and other such information.

The docking stations 106 are geographically distributed over one or more geographic areas (e.g., neighborhoods, cities, counties, states, etc.), and in some instances may be associated with a particular building or one or more customers. For example, a particular docking station may be secured at a customer's residence, one or more docking stations may be secured at an apartment and/or condominium complex, one or more docking stations may be secured at a transportation hub (e.g., a subway station, a bus stop, etc.), one or more docking stations may be secured at shopping facilities (e.g., retail stores, malls, etc.), and/or placed in other relevant locations.

In some embodiments, the central control system and/or a delivery coordination system schedules delivery of products to relevant delivery locations. Often products are to be placed into delivery lockers 104 and the lockers transported to respective delivery locations to provide secure delivery to customer delivery locations. The lockers can be transported by delivery vehicles 108 and/or in some instances, the lockers themselves may be a delivery vehicle, such as an unmanned delivery vehicle with one or more motors, wheels, directional control system, navigation system, and the like. Further, other delivery vehicles may transport lockers to launch locations to launch one or more motorized lockers allowing the lockers to autonomously transport themselves from the launch location to a corresponding intended delivery location. In other instances, a worker may drive the delivery vehicle to a delivery location and deliver a respective locker to the delivery location. Some embodiments may employ other methods of transporting the lockers 104 to intended delivery locations.

Customers using user interface units 116 (e.g., smartphones, tablets, computers, laptops, etc.) can access one or more retailers and/or product fulfillment center systems over the one or more distributed networks 110 to order and purchase one or more products. Further, the product orders may designate and/or request that the one or more products of the order be delivered in a locker 104 to a docking station associated with the customer. In other instances, the central control system identifies, for example through the customer database and/or profile information, that a docking station 106 is associated with the customer. Based on the received orders, the central control system (or a scheduling system) can schedule deliveries and provide relevant delivery routing information (e.g., street map routing, turns, distances, flight path information, etc.) to be followed by the delivery vehicle 108 in delivering the one or more lockers and/or products. In some instances, the delivery routing is based in part on the type of delivery vehicle.

The docking stations 106 are configured to couple with and secure one or more delivered lockers. Once delivered, customers can open the lockers to gain access to the one or more products placed into the locker. In some embodiments, prior to a locking of a docking station with a locker, the docking station can authenticate the locker and/or the locker can authenticate the docking station. For example, the docking station 106 may be in communication with the central control system to receive notification of a scheduled delivery and/or may receive information (e.g., identifier information, passcodes, encryption key information, etc.) about one or more lockers intended to be cooperated with the docking station. Similarly, the central control system may communicate with one or more lockers and provide relevant docking station information (e.g., identifier information, passcodes, encryption key information, etc.) of a docking station. Further, the docking stations and lockers can further be configured to communicate with each other to allow the docking station to authenticate the locker and/or the locker to authenticate the docking station.

Figure 2:
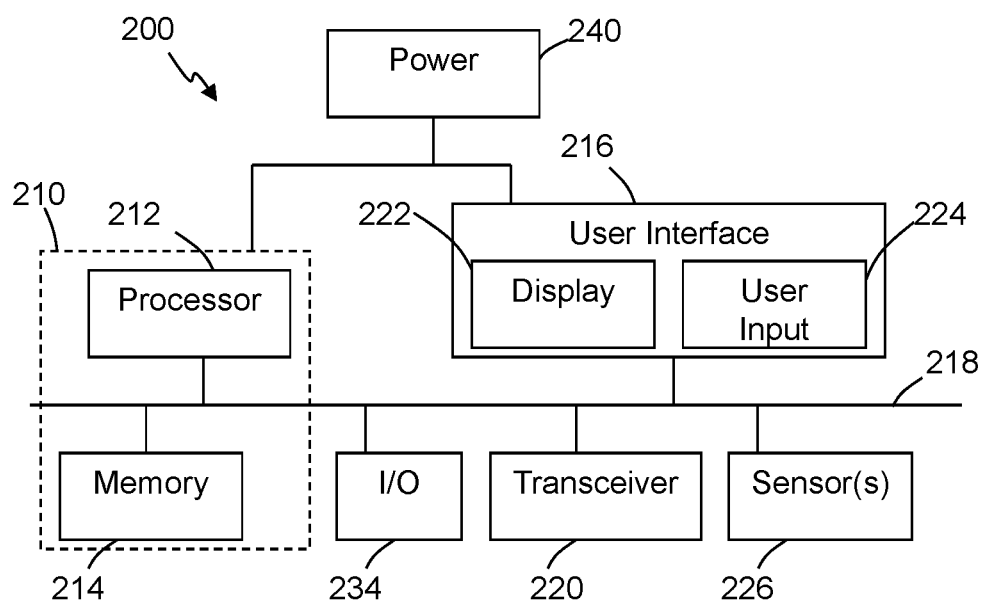
FIG. 2 illustrates an exemplary system for use in implementing methods, techniques, devices, apparatuses, systems, servers, sources and enabling the distribution and use of delivery lockers, in accordance with some embodiments.

The circuits, circuitry, systems, devices, processes, methods, techniques, functionality, services, servers, sources and the like described herein may be utilized, implemented and/or run on many different types of devices and/or systems. FIG. 2 illustrates an exemplary system 200 that may be used for implementing any of the components, circuits, circuitry, systems, functionality, apparatuses, processes, or devices of the product delivery system 100, and/or other above or below mentioned systems or devices, or parts of such circuits, circuitry, functionality, systems, apparatuses, processes, or devices. For example, the system 200 may be used to implement some or all of the central control system 102, the lockers 104, the docking stations 106, the delivery vehicles 108, the inventory system 112, the user interface units 116, and/or other such components, circuitry, functionality and/or devices. However, the use of the system 200 or any portion thereof is certainly not required.

By way of example, the system 200 may comprise a control circuit or processor module 212, memory 214, and one or more communication links, paths, buses or the like 218. Some embodiments may include one or more user interfaces 216, and/or one or more internal and/or external power sources or supplies 240. The control circuit 212 can be implemented through one or more processors, microprocessors, central processing units, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 212 can be part of control circuitry and/or a control system 210, which may be implemented through one or more processors with access to one or more memory 214 that can store instructions, code and the like that is implemented by the control circuit and/or processors to implement intended functionality. In some applications, the control circuit and/or memory may be distributed over the communications network 110 (e.g., LAN, WAN, Internet, etc.) providing distributed and/or redundant processing and functionality. Again, the system 200 may be used to implement one or more of the above or below, or parts of, components, circuits, systems, processes and the like. For example, the system may implement the central control system 102 with the control circuit being a central control circuit, a locker 104 with a locker control circuit, a docking station 106 with a docking station control circuit, a user interface unit 116 with a user interface control circuit, or other components.

The user interface 216 can allow a user to interact with the system 200 and receive information through the system. In some instances, the user interface 216 includes a display 222 and/or one or more user inputs 224, such as buttons, touch screen, track ball, keyboard, mouse, etc., which can be part of or wired or wirelessly coupled with the system 200. Typically, the system 200 further includes one or more communication interfaces, ports, transceivers 220 and the like allowing the system 200 to communicate over a communication bus, a distributed computer and/or communication network 110 (e.g., a local area network (LAN), wide area network (WAN), the Internet, etc.), communication link 218, other networks or communication channels with other devices and/or other such communications or combination of two or more of such communication methods. Further the transceiver 220 can be configured for wired, wireless, optical, fiber optical cable, satellite, or other such communication configurations or combinations of two or more of such communications. Some embodiments include one or more input/output (I/O) ports 234 that allow one or more devices to couple with the system 200. The I/O ports can be substantially any relevant port or combinations of ports, such as but not limited to USB, Ethernet, or other such ports. The I/O interface 234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 226 to provide information to the system and/or sensor information that is communicated to another component, such as the central control system, a docking station, a locker, a delivery vehicle, etc. The sensors can include substantially any relevant sensor, such as distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, cameras, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 200 comprises an example of a control and/or processor-based system with the control circuit 212. Again, the control circuit 212 can be implemented through one or more processors, controllers, central processing units, logic, software and the like. Further, in some implementations the control circuit 212 may provide multiprocessor functionality.

The memory 214, which can be accessed by the control circuit 212, typically includes one or more processor readable and/or computer readable media accessed by at least the control circuit 212, and can include volatile and/or nonvolatile media, such as RAM, ROM, EEPROM, flash memory and/or other memory technology. Further, the memory 214 is shown as internal to the control system 210; however, the memory 214 can be internal, external or a combination of internal and external memory. Similarly, some or all of the memory 214 can be internal, external or a combination of internal and external memory of the control circuit 212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 110. The memory 214 can store code, software, executables, scripts, data, content, lists, programming, programs, log or history data, user information, customer information, product information, and the like. While FIG. 2 illustrates the various components being coupled together via a bus, it is understood that the various components may actually be coupled to the control circuit and/or one or more other components directly.

Referring back to FIG. 1, the docking stations 106 are configured to be distributed at different geographic locations. Typically, the docking stations are secured at a location (e.g. bolted to the concrete, locked to a building, locked to a lamp post, other such methods or combination of two or more of such methods). In some instances, the docking stations may be temporarily located at a delivery location, while in other instances, may be substantially permanently fixed to a location. The lockers 104 are transported to a delivery location and configured to cooperate with a docking station at the delivery location. Delivery vehicles 108 are directed to a delivery location, a docking station 106, launch location, or other relevant location associated with a predefined customer to enable a locker to be cooperated with a corresponding docking station 106.

Figure 3:
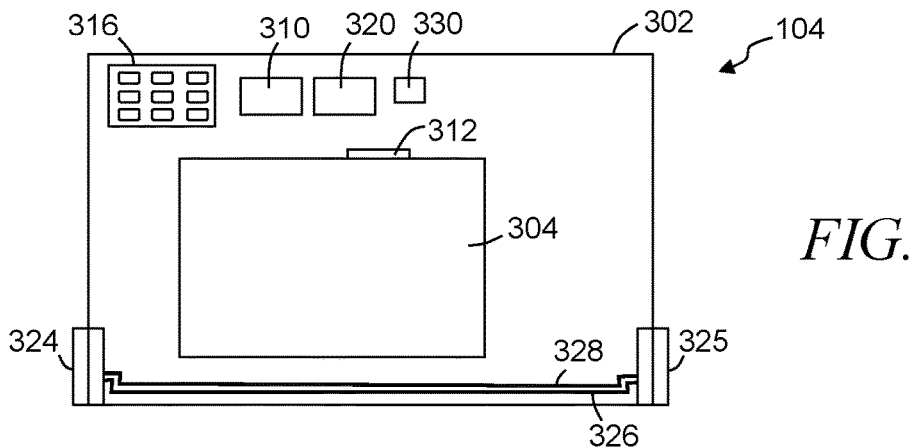
FIG. 3 illustrates a simplified block diagram of an exemplary locker, in accordance with some embodiments.
Figure 4:
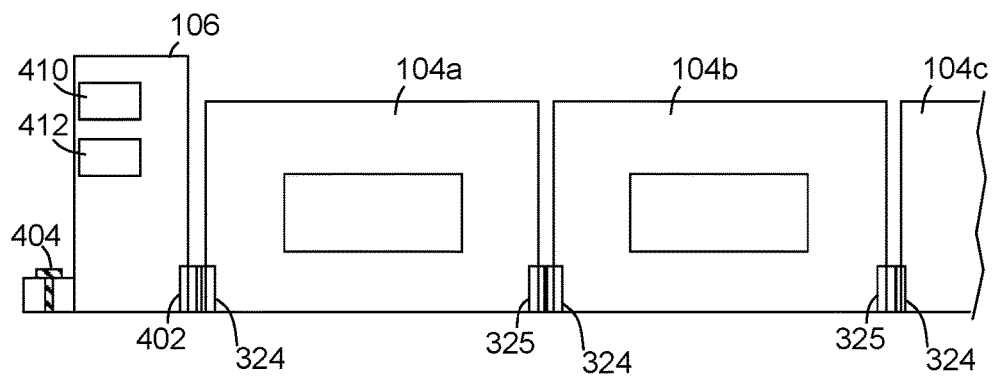
FIG. 4 illustrates a simplified block diagram of an exemplary docking station cooperated with a first locker and a second locker, in accordance with some embodiments.

FIG. 3 illustrates a simplified block diagram of an exemplary locker 104, in accordance with some embodiments. FIG. 4 illustrates a simplified block diagram of an exemplary docking station 106 cooperated with a first locker 104a, a second locker 104b, and a third locker 104c, in accordance with some embodiments. Referring to FIGS. 1-4, in some embodiments, the lockers 104 include a housing 302 that encloses at least one interior product cavity into which one or more products can be placed. One or more doors 304 are positioned within and/or formed in the housing 302 and configured to open to enable access to one or more product cavities. In some embodiments, a locker includes a locker control circuit 310. A door locking system 312 may be included to lock and unlock the door 304 of the locker. In some instances, the locker control circuit cooperates with one or more door locking systems 312 control the locking and unlocking of the door 304 of the locker. The locker typically further included one or more wired and/or wireless transceivers 320 enabling the locker control circuit 310 to communicate with at least the docking station 106, and in some instances, one or more other lockers, delivery vehicles 108, central control system 102, and/or other components of the system 100.

In some applications, the locker further includes a user interface 316 to allow workers and/or a customer to interact with the locker. For example, the user interface may include buttons to allow a customer to enter an access code to cause the locking system 312 to unlock and/or open the door 304. In other instances, a customer and/or worker may use a user interface unit 116 to communicate with the locker control circuit 310.

At least some of the lockers 104 further comprise multiple docking couplers 324, 325. Each of the docking couplers 324, 325 is configured to securely dock and lock with a locker coupler 402 of a docking station 106. Further, one or more of the docking couplers 324, 325 and/or each of the docking couplers is configured to securely dock and lock with a dock coupler of another of the multiple lockers 104. The multiple docking couplers 324, 325 allows multiple lockers to be coupled together, and in some instances, coupled in a daisy chain or train configuration. As illustrated in FIG. 4, a first docking coupler 324 of a first locker 104a docks with a locker coupler 402 of the docking station 106, while a second docking coupler 325 of the first locker can dock and lock with a first docking coupler 324 of a second locker 104b. Similarly, some embodiments enables substantially any number of lockers 104 to be cooperated together through the docking couplers.

The docking couplers can be substantially any relevant coupling system that allows the lockers to lock with the docking station 106 and/or one or more other lockers. In some embodiments, the docking couplers comprise an electronic locking system that allows the locker control circuit 310 to activate and deactivate the docking coupler to lock and unlock allowing the lockers to be secured with the docking station (or other locker) and subsequently be removed from the docking station (e.g., after products have been removed by the customer, a delivery worker, delivery vehicle and/or the locker itself can remove the locker from the docking station). Accordingly, in some embodiments, the locker control circuit is coupled with the docking couplers and/or a coupler control circuit, and can communicate commands and/or instructions to control the locking and unlocking of the docking couplers.

In some embodiments, at least some lockers further include one or more communication links 326 between a first docking coupler 324 and a second docking coupler 325 of the locker. The communication link enables communications between and across lockers. In some embodiments, for example the docking station 106 can communicate with a second locker 104b, third locker 104c, or substantially any locker along a series or chain of lockers through the series of communication links 326 extending between docking couplers of the chain of lockers. Typically, the locker control circuits 310 are further communicatively coupled with the docking couplers and/or the communication link allowing the locker control circuits to communicate at least with the docking station 106, when coupled with the docking station.

The docking stations can be positioned at different customer delivery locations, and thus distributed about one or more geographic areas. The docking stations are typically temporarily or permanently secured at a location (e.g., through bolting 404 of the docking station with a concrete foundation, sidewalk, road, building, etc., cable locked to a pole, building, bike rack, etc., or otherwise secured at a delivery location). The docking stations include one or more locker couplers 402 that are configured to secure a locker with the docking station. In some embodiments, one or more of the docking stations includes a station control circuit 410 and memory accessible by the station control circuit. The station control circuit can be configured to obtain a locker identifier from a locker of the multiple delivery lockers that is scheduled to couple with the docking station and/or attempting to couple with the docking station. For example, the locker 104 may communication a request to the docking station when the locker is within a threshold distance of the docking station requesting authorization to dock with the docking station. The request and/or a subsequent communication may include the locker identifier. The docking station control circuit may use the identifier information to confirm that the locker is scheduled to dock with the docking station of the multiple docking stations. In some instances, the control circuit may communicate with the central control system to receive a notification and/or scheduling of a locker scheduled to dock with the docking station.

In some embodiments, the docking station control circuit is configured to authorize and/or deny a locker to dock with the docking station based on the locker identifier. When authorized, the docking station control circuit can authorize a locking of the docking station with a first docking coupler 324 of an identified locker. The locking may be implemented by the docking coupler 324 of the locker, the locker coupler 402 of the docking station, or a combination thereof. In some embodiments, the docking station control circuit is communicatively coupled with a locking system of the locker coupler and can issue commands to the locking system to activate and deactivate the locking or unlocking of the locker coupler. Similarly, the docking station control circuit may communicate instructions through a communication coupling between the docking station and the locker, to a locker control circuit 310 to trigger the unlocking (or locking when relevant) of a docking coupler locking system.

Typically, the docking station further includes one or more communication transceivers 412 enabling the station control circuit to communicate with the remote central control system 102, one or more lockers 104, a delivery vehicle 108, delivery workers' user interface units 116, remote databases and/or other components. Further, the locker coupler 402 may include one or more communication interface that mates with a corresponding communication interface of a docking coupler of a locker. This allows wired communication between the docking station control circuit 410 and the locker control circuit 310, and/or allows communication over the communication link 326 with one or more other lockers daisy chain coupled. Further, the communication port can be configured to allow a coupling through the docking station between the locker control circuit and the distributed network 110. Additionally or alternatively, communication through the locker coupler may be established through the docking station control circuit 410 and/or one or more transceivers of the docking station.

Although FIG. 4 illustrates the docking station 106 directly coupled with a single locker, in other instances, the docking station may include multiple locker couplers 402 allowing multiple different lockers to directly couple with the docking station. Further, through the second docking couplers 325, one or more of the lockers directly coupled with the docking station may further enable the daisy chain coupling with one or more additional lockers.

In some embodiments, the station control circuit 410 is further configured to obtain a second locker identifier from a second locker 104b of the multiple delivery lockers. Based on the second locker identifier, the station control circuit can confirm the second locker is scheduled to dock with the docking station. Further, the docking station control circuit can authorize the locking of the second docking coupler 325 of a first locker 104a with the first docking coupler 324 of the second locker 104b when the second locker is confirmed to dock with the docking station.

In some embodiments, the locker coupler 402 may include an electrical power coupler that is configured to electrically couple with an electrical power coupler of a locker. In some embodiments, the power couplers are part of the locker coupler and docking station coupler. The power couplers enables electrical power to be supplied to from the docking station to the locker. The power may be used to charge a rechargeable power source of the locker, to power the locker control circuit when coupled, power a temperature control system 330, and/or other components and/or systems of the locker. In some implementations, one or more lockers may further include an electrical power conductor 328 extending between a first docking coupler 324 and a second docking coupler 325. The electrical power couplers enable electrical coupling between the docking station and a locker, as well as between lockers such that electrical power can be supplied to multiple lockers through a daisy chain coupling. Further, in some applications, the station control circuit is further configured to monitor electrical power usage by the first locker. The station control circuit may be configured to further monitor electrical power usage by the second locker independent of the electrical power usage of a first locker.

The docking station is typically communicatively couples with the distributed network 110 through a network coupler and one or more transceivers 412. The locker coupler 402 and docking couplers 324-325 may, in some embodiments, further include one or more communication couplers. For example, the communication couplers may be part of the locker coupler 402 and the docking couplers 324-325 establishing wired communication between the docking station and the lockers. Additionally or alternatively, the docking station may wirelessly communicate with one or more of the lockers. Through the coupling with the network, the docking station can provide a communication path between a locker and the network. Further, some lockers include the communication link or connection 326 between the first and second docking couplers 324-325 which can establish a communication path between the communication network 110 and one or more successively coupled lockers.

In some embodiments, the lockers can include a temperature control system 330 that can adjust and/or control temperature within one or more product cavities of a locker. The locker control circuits may couple with the temperature control systems to provide desired temperature information, one or more temperature thresholds and the like. Additionally or alternatively, the control circuit can communicate activation and deactivation instructions to the temperature control system. One or more temperature sensors can be cooperated with each product cavity of a locker to provide sensed temperature data relative to the interior of the product cavity to the locker control circuit and/or the temperature control system, which can use the sensor data to cause adjustments in temperature within the corresponding product cavity based on one or more temperature thresholds and/or desired product temperatures. The locker control circuit can control an interior temperature of the product cavity of the locker. In some embodiments, the different lockers can independently control temperature within their respective product cavities. For example, a second locker control circuit can control an interior temperature of the product cavity of the second locker independent of the temperature of the product cavity of a first locker.

In some embodiments, one or more lockers that are cooperated with a docking station may additionally or alternatively authenticate a subsequent locker attempting to dock to a locker already cooperated with the docking station. For example, a locker control circuit of a first locker 104b, which has been docked to a docking station or another locker of one or more lockers docked to the docking station, can be configured to obtain a second locker identifier from a second locker 104c, of the multiple delivery lockers, intending to be cooperated with the first locker. The first locker control circuit can confirm the second locker is scheduled to dock with the docking station. In some instances, the first locker control circuit may communicate with the docking station control circuit to receive information regarding a docking schedule, the first locker control circuit may communicate with the central control system to obtain information regarding the docking schedule, or obtain the docking schedule information from one or more other such sources. The first locker control circuit can authorize or decline the locking of the second docking coupler 325 of the first locker 104b with the first docking coupler 324 of the second locker 104c when the second locker is confirmed to dock with the docking station.

As described above, the lockers may be transported to the docking station by a delivery vehicle. The delivery vehicle may be driven by a delivery worker, while in other instances, a delivery vehicle may be an unmanned delivery vehicle that autonomously transports at least one locker to the docking station based on delivery route information, which may be communicated to the delivery vehicle and/or updated over time based on one or more factors, including for example changes in location of the delivery vehicle over time. The docking station and/or one or more lockers may communicate with a delivery vehicle when a locker is to be docked with the docking station and/or another locker cooperated with the docking station, and/or when a delivery vehicle is picking up one or more lockers. The docking station control circuit 410 can be configured to identify that an unmanned delivery vehicle 108 transporting a locker is within a threshold distance of the docking station. For example, the unmanned delivery vehicle may communication a notification to the docking station, the central control system may receive status information regarding at least a location of the delivery vehicle and can relay information to the docking station, the docking station may use one or more sensors to detect the delivery vehicle (e.g., RFID, distance measurement sensors, bar code sensors, etc.), other notifications, or combination of two or more of such notifications. In some instances, the docking station control circuit authenticates the unmanned delivery vehicle prior to and/or during the docking of the locker. Further, in some embodiments, the docking station control circuit 410 and/or one or more of the locker control circuits 310 may cause the communication of a docking station identifier and/or one or more locker identifiers to the delivery vehicle 108 and/or the one or more lockers being transported by the delivery vehicle. The delivery vehicle and/or the one or more transported lockers may authenticate the docking station and/or one or more of the docked lockers prior to the transported lockers attempting to dock with the docking station and/or a docked locker.

Authorization to dock the transported locker may be wirelessly communicated to the delivery vehicle and/or the transported locker, which can communicate instructions to the delivery vehicle to initiate docking. Additionally, the docking station control circuit 410 and/or a locker control circuit 310 may activate the locker coupler 402 or docking coupler to lock the delivered locker with the docking station or locker already cooperated with the docking station or another locker or lockers cooperated with the docking station. In some instances, the docking is not allowed without proper authentication. For example, the docking station control circuit may prevent the locker coupler 402 from opening when authentication is not confirmed, which prevents a docking coupler 324 for coupling with the locking coupler. Similarly, authentication may prevent an opening of a locking coupler, and/or the delivery vehicle will not attempt to couple a locker with a docking station or other locker when authentication is not confirmed. Providing the lockers with multiple docking couplers 324-325 enables multiple lockers to be daisy chain docked with the docking stations. Further, in some embodiments the docking couplers enable power transfer from the docking station and between lockers, and/or a communication connection between the docking station and the series of coupled lockers.

The lockers can further be configured to limit access to products within the one or more product cavities. In some instances, the locker control circuit prevents the unlocking of the door 304 unless a customer can provide authentication information. The customer authentication information may be entered through a user interface 316 on the locker (e.g., entering a customer defined code, a retail facility specified code, finger print analysis, other such authentication, or combination of two or more methods of authentication). Additionally or alternatively, the customer may use a customer user interface unit 116 to communicate an authentication to the locker control circuit, docking station control circuit, and/or central control circuit. Upon authenticating a customer, the locker may open the door and/or may be undocked from the docking station and/or another locker to allow the customer to transport the locker (e.g., into their residence).

As described above, in some embodiments a delivery vehicle and/or delivery worker may retrieve one or more lockers 104 docked with the docking station 106. Further, in some embodiments, customers may return one or more products by placing the returned product into a locker that is to be picked up. In some embodiments, the customer communicates with the central control system 102, the docking station control circuit 410 and/or a locker control circuit 310, notifying the system of the intent to return a product. For example, the customer may communicate through a user interface unit 116 to request return instructions. The return instructions may be communicated from the central control circuit, the docking station control circuit or a locker control circuit with instructions for returning the product. For example, the return instructions may identify a locker in which the product is to be placed. In other instances, the customer may simply select a locker and place the product within the locker. In some embodiments, lockers may include one or more sensors that can be used to identify the product (e.g., RFID tag reader, bar code reader, image processing, text capture, weight sensor, etc.). Based on the identified product, the locker and/or the docking station can notify the central control system 102 requesting scheduling of a product return.

Figure 5:
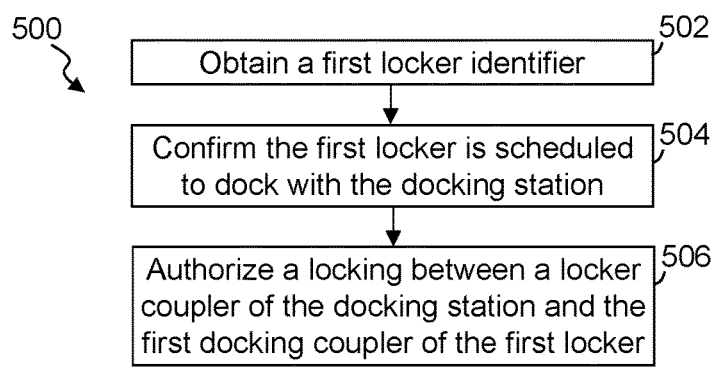
FIG. 5 illustrates a simplified block diagram of an exemplary process of docking one or more retail delivery lockers, in accordance with some embodiments.

FIG. 5 illustrates a simplified block diagram of an exemplary process 500 of docking one or more retail delivery lockers 104, in accordance with some embodiments. In step 502, a first locker identifier, from a locker of multiple different delivery lockers, is obtained by a station control circuit 410 of a docking station 106 of multiple different docking stations at different customer delivery locations. The delivery lockers comprise a housing enclosing at least an interior product cavity. A door is formed and/or cooperated with the housing and can be closed to secure one or more products within the product cavity, and opened to enable access to at least the product cavity. The lockers further include multiple docking couplers 324, 325 each configured to securely dock and lock with a docking station at a customer delivery location, and further configured to dock and lock with a docking coupler 324, 325 of another of the multiple lockers. At least some of the lockers include a communication link between a first docking coupler and the second docking coupler of the locker.

In step 504, it is confirmed that the locker is scheduled to dock with the docking station. This confirmation can be based on a docking station control circuit receiving an identifier of the locker to be docked, an identifier of the delivery vehicle transporting the locker, an identifier of a delivery worker, and/or other such identifiers. The identifier information can be confirmed based on a delivery schedule, which is typically defined by the central control circuit, one or more delivery scheduling systems, or the like. In some embodiments, one or more additional lockers can be docked with the docking station and/or docked with the docking station through another locker that is docked with the docking station allowing a chain of lockers to be docked with the docking station. A locker identifier can be obtained from one or more additional lockers of the multiple delivery lockers. The docking station control circuit and/or a locker control circuit can confirm that the one or more additional lockers are scheduled to dock with the docking station. An authorization can be issued authorizing the locking of the second docking coupler of a first locker with a first docking coupler of a second locker when the second locker is confirmed to dock with the docking station. In step 506, a locking between a locker coupler of the docking station and the first docking coupler of the first locker is authorized, based in part on the confirmation that the locker is schedule to dock with the docking station.

Some embodiments supply electrical power from the docking station to a first locker through an electrical power coupler of the docking station electrically coupled with the docking coupler of the first locker. Further, some embodiments supply electrical power to a second locker through an electrical power conductor extending between the first coupler and the second coupler of the first locker. In some embodiments, power usage by at least the first locker is monitored. Further, some embodiments monitor power usage by a second locker independent of the power usage of the first locker. For example, a separate electrical coupling from the locker coupler may be provided to couple to subsequently lockers. As another example, power may be scheduled so that power is supplied to different lockers depending on the schedule, which may be used to charge power sources on the lockers so that the lockers can use the charged power sources to operate components of the locker when not receiving power from the docking station based on the schedule. In yet other instances, power draws may be modulated based on a number of lockers coupled. Other power distributions and/or tracking can be employed.

In some embodiments, a communication path is established between an external distributed communication network 110 with which the docking station is communicatively coupled and one or more lockers (e.g., both first and second lockers) communicatively coupled with the docking station. Further, some embodiments control, through a first locker control circuit 310 of a first locker, an interior temperature of the product cavity of the first locker. In some embodiments, an interior temperature of a product cavity of a second locker can be controlled, through a second locker control circuit of the second locker, independent of the temperature of the product cavity of the first locker.

A first locker control circuit of a first locker can, in some implementations, obtain a second locker identifier from a second locker of multiple different potential delivery lockers. It can be confirmed that the second locker is scheduled to dock with the docking station. When confirmed, the locking of the second docking coupler of the first locker with the first docking coupler of the second locker can be authorized when the second locker is confirmed to dock with the docking station. Some embodiments identify that a delivery vehicle (e.g., an unmanned delivery vehicle) transporting the first locker is within a threshold distance of the docking station, and the delivery vehicle can be authenticated. In some instances, the delivery vehicle can dock at locker being transported by the delivery vehicle after the delivery vehicle and/or the locker has been authenticated.

In some embodiments, systems and a corresponding methods performed by the system, provide a retail delivery locker system comprising: multiple delivery lockers each comprising: a housing enclosing at least an interior product cavity; a door positioned within the housing and configured to open to enable access to at least the product cavity; a first docking coupler and a second docking coupler, wherein each of the first docking coupler and the second docking coupler are configured to securely dock and lock with a docking station at a customer delivery location and a docking coupler of another of the multiple lockers; and a communication link between the first docking coupler and the second docking coupler; and multiple docking stations each positioned at different customer delivery locations, wherein each of the multiple docking stations comprises: a locker coupler configured to secure a locker with the docking station; a station control circuit and memory accessible by the station control circuit and storing instructions that when executed by the station control circuit cause the station control circuit to obtain a first locker identifier from a first locker of the multiple delivery lockers, confirm the first locker is scheduled to dock with a docking station of the multiple docking stations, and authorize the locking of the docking station with the first docking coupler; and a transceiver enabling the station control circuit to communicate with a remote central control system.

Some embodiments provide methods of docking retail delivery lockers, comprising: obtaining, by a station control circuit of a docking station of multiple docking stations at different customer delivery locations, a first locker identifier from a first locker of multiple delivery lockers, wherein each delivery locker comprises a housing enclosing at least an interior product cavity, a door configured to open to enable access to at least the product cavity, a first docking coupler and a second docking coupler each configured to securely dock and lock with a docking station at a customer delivery location and a docking coupler of another of the multiple lockers, and a communication link between the first docking coupler and the second docking coupler; confirming the first locker is scheduled to dock with the docking station; authorizing a locking between a locker coupler of the docking station and the first docking coupler of the first locker.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail delivery locker system, comprising:
   multiple delivery lockers each comprising:
     a housing enclosing at least an interior product cavity;
     a first docking coupler and a second docking coupler, wherein each of the first docking coupler and the second docking coupler are configured to securely dock with a docking station and a docking coupler of another of the multiple delivery lockers; and
     a communication link between the first docking coupler and the second docking coupler; and
   multiple docking stations each positioned at different delivery locations, wherein each of the multiple docking stations comprises:
     a locker coupler configured to dock with one of the first docking coupler and the second docking coupler of any of the multiple delivery lockers;
     a station control circuit and memory accessible by the station control circuit and storing instructions that when executed by the station control circuit cause the station control circuit to confirm a first locker is scheduled to dock with a docking station of the multiple docking stations, and authorize a locking of the corresponding docking station of the multiple docking stations with the first docking coupler of the first locker.

2. The system of claim 1, wherein the station control circuit is further configured to confirm a second locker is scheduled to dock with the corresponding docking station, and authorize the locking of the second docking coupler of the first locker with the first docking coupler of the second locker when the second locker is confirmed to dock with the corresponding docking station.

3. The system of claim 2, wherein the corresponding docking station further comprises an electrical power coupler, and the first locker comprises an electrical power conductor extending between the first coupler and the second coupler, wherein the electrical power coupler is configured to electrically couple with the first docking coupler of the first locker to supply electrical power to the first locker and the second locker.

4. The system of claim 3, wherein the station control circuit is further configured to monitor electrical power usage by the first locker and monitor electrical power usage by the second locker independent of the electrical power usage of the first locker.

5. The system of claim 2, wherein the corresponding docking station further comprises a network coupler configured to communicatively couple with an external distributed communication network, and a communication coupler; and
   wherein the first locker comprises a communication connection between the first coupler and the second coupler, wherein the communication coupler is configured to communicatively couple with the first docking coupler of the first locker to establish a communication path between the external distributed communication network and the first locker and the second locker.

6. The system of claim 2, wherein the first locker comprises a first locker control circuit configured to control an interior temperature of the product cavity of the first locker; and
   wherein the second locker comprises a second locker control circuit configured to control an interior temperature of the product cavity of the second locker independent of the temperature of the product cavity of the first locker.

7. The system of claim 2, wherein the corresponding docking station further comprises a communication coupler;
   wherein the first locker comprises a communication connection between the first coupler and the second coupler; and
   wherein the station control circuit is configured to transmit communications to the second locker over the communication connection between the first coupler and the second coupler of the first locker.

8. The system of claim 1, wherein the first locker comprises a first locker control circuit configured to obtain a second locker identifier from a second locker of the multiple delivery lockers, confirm the second locker is scheduled to dock with the corresponding docking station, and authorize the locking of the second docking coupler of the first locker with the first docking coupler of the second locker when the second locker is confirmed to dock with the corresponding docking station.

9. The system of claim 1, wherein the station control circuit is further configured to identify that an unmanned delivery vehicle transporting the first locker is within a threshold distance of the corresponding docking station, and authenticates the unmanned delivery vehicle prior to authorizing the first locker to dock with the corresponding docking station.

10. The system of claim 1, wherein each of the first docking coupler and the second docking coupler of each of the multiple delivery lockers is configured to couple with any one of the first docking coupler or the second docking coupler of any of the other of the multiple delivery lockers providing a daisy chain coupling of a set of two or more of the multiple delivery lockers cooperated with the corresponding docking station of the multiple docking stations through the daisy chain coupling.

11. A method of docking retail delivery lockers, comprising:
confirming, by a station control circuit of a docking station of multiple docking stations at different delivery locations, a first locker of multiple delivery lockers is scheduled to dock with the docking station, wherein each delivery locker of the multiple delivery lockers comprises a housing enclosing at least an interior product cavity a first docking coupler and a second docking coupler each configured to securely dock and lock with any of the multiple docking stations and a docking coupler of another of the multiple lockers, and a communication link between the first docking coupler and the second docking coupler; and
authorizing a locking between a locker coupler of the docking station and the first docking coupler of the first locker.

12. The method of claim 11, further comprising:
confirming a second locker is scheduled to dock with the docking station; and
authorizing the locking of the second docking coupler of the first locker with the first docking coupler of the second locker when it is confirmed that the second locker is scheduled to dock with the docking station.

13. The method of claim 12, further comprising:
supplying electrical power from the docking station to the first locker through an electrical power coupler of the docking station electrically coupled with the first docking coupler of the first locker, and to the second locker through an electrical power conductor extending between the first coupler and the second coupler of the first locker.

14. The method of claim 12, further comprising:
monitoring power usage by the first locker; and
monitoring power usage by the second locker independent of the power usage of the first locker.

15. The method of claim 12, further comprising:
establishing a communication path between an external distributed communication network with which the docking station is communicatively coupled and both the first locker and the second locker.

16. The method of claim 12, further comprising:
controlling, through a first locker control circuit of the first locker, an interior temperature of the product cavity of the first locker; and
controlling, through a second locker control circuit of the second locker, an interior temperature of the product cavity of the second locker independent of the temperature of the product cavity of the first locker.

17. The method of claim 12, further comprising:
causing communications from the station control circuit and to the second locker over a communication connection between the first coupler and the second coupler of the first locker.

18. The method of claim 11, further comprising:
by a first locker control circuit of the first locker:
obtaining a second locker identifier from a second locker of the multiple delivery lockers;
confirming the second locker is scheduled to dock with the docking station; and
authorizing the locking of the second docking coupler of the first locker with the first docking coupler of the second locker when the second locker is confirmed to dock with the docking station.

19. The method of claim 11, further comprising:
identifying that an unmanned delivery vehicle transporting the first locker is within a threshold distance of the docking station, and
authenticating the unmanned delivery vehicle.

20. The method of claim 11, further comprising:
daisy chain coupling a set of two or more of the multiple delivery lockers, including the first delivery locker, with each other to lock the daisy chain coupled set of two or more of the multiple delivery lockers with the docking station.

* * * * *

UNITED STATES PATENT AND TRADEMARK OFFICE
CERTIFICATE OF CORRECTION

PATENT NO. : 10,296,866 B2
APPLICATION NO. : 16/058862
DATED : May 21, 2019
INVENTOR(S) : Donald R. High et al.

Page 1 of 1

It is certified that error appears in the above-identified patent and that said Letters Patent is hereby corrected as shown below:

In the Claims

Column 15, Line 29, Claim 11, insert --,-- after "cavity".

Signed and Sealed this
Seventeenth Day of September, 2019

Andrei Iancu
*Director of the United States Patent and Trademark Office*